United States Patent [19]
Meyer et al.

[11] 3,896,360
[45] July 22, 1975

[54] METHOD AND APPARATUS FOR AUTOMATIC FORWARD FEED PROGRAMMED CONTROL OF A MACHINE TOOL

[75] Inventors: Jurgen Meyer; Siegfried Waller, both of Erlangen, Germany

[73] Assignee: Siemens Aktiengesellschaft, Munich, Germany

[22] Filed: May 27, 1971

[21] Appl. No.: 147,707

Related U.S. Application Data

[63] Continuation-in-part of Ser. No. 866,507, Oct. 15, 1969, abandoned.

[30] Foreign Application Priority Data
Oct. 18, 1968  Germany............................ 1803742

[52] U.S. Cl................................. 318/571; 318/39
[51] Int. Cl. .................................................. G05b 19/24
[58] Field of Search............................... 318/39, 571

[56] References Cited
UNITED STATES PATENTS

| | | | |
|---|---|---|---|
| 3,191,205 | 6/1965 | Gilbert........................... | 318/571 X |
| 3,273,182 | 9/1966 | McDonald..................... | 318/571 X |
| 3,418,549 | 12/1968 | Emerson et al................. | 318/571 X |
| 3,545,310 | 12/1970 | Porath et al. ................... | 318/39 X |
| 3,573,588 | 4/1971 | Geyer et al. ...................... | 318/39 X |
| 3,665,493 | 5/1972 | Glowzewski et al. ........... | 318/571 X |
| 3,671,839 | 6/1972 | Meyer et al......................... | 318/571 |
| 3,671,840 | 6/1972 | Meyer et al......................... | 318/571 |
| 3,684,873 | 8/1972 | Meyer et al....................... | 318/39 X |

*Primary Examiner*—T. E. Lynch
*Attorney, Agent, or Firm*—Herbert L. Lerner

[57] ABSTRACT

A tool is rapidly fed until it comes into contact with a workpiece. The tool is work fed only after a magnitude depending upon the forming power exceeds a lower threshold level. The work feeding and movement of the tool are reduced in the direction of reduce feed-in for a period of time until the magnitude depending upon the forming power exceeds an upper threshold level. A feed-in is additionally provided up to the programmed contour of the workpiece, additionally to moving the tool at reduced feedin, when the forming power reaches the upper threshold level, for a period of time sufficient for the magnitude to exceed the lower threshold level in dependence upon the forming power thereby providing optimum cutting distribution.

2 Claims, 12 Drawing Figures

METHOD AND APPARATUS FOR AUTOMATIC FORWARD FEED PROGRAMMED CONTROL OF A MACHINE TOOL

DESCRIPTION OF THE INVENTION

The present application is a continuation-in-part of application Ser. No. 866,507, filed Oct. 15, 1969 now abandoned for "Method and Apparatus for Automatic Forward Feed Programmed Control of a Machine Tool."

The invention relates to the automatic forward feed programmed control of a machine tool. More particularly, the invention relates to a method and apparatus for the automatic forward feed programmed control of a machine tool.

In a system of the type of the invention, a rapid feed is provided for the tool until it engages the workpiece, and the switch over to the work feed of the tool is effected only after a magnitude, depending upon the forming power, exceeds a lower threshold level. This is disclosed in copending Patent Application Ser. No. 777,832 (F-3948).

The magnitude depending upon the forming power may be the torque which is absorbed by the machine tool, workpiece, or the like, or it may be the force which is exerted upon said machine tool.

It has been suggested that a reduction in the work feed and/or movement of the tool in the direction of reduced feed-in be effected for a period of time such that the magnitude which depends upon the forming power exceeds an upper threshold level.

In order to fabricate a workpiece from raw material by cutting, or the like, a plurality of cuts are generally required. The removal of the material which is distributed to the individual sections or cuts must be considered in the programming of a digital or numerical controlled machine. Therefore, the removal of the material must be determined prior to the actual machine operation. In order to prevent overloading of the machine, smaller cutting depths than are feasible at optimum utilization of the machine are programmed.

The principal object of our invention is to provide a new and improved method and apparatus for automatic forward feed programmed control of a machine tool.

An object of our invention is to provide a method for the automatic forward feed programmed control of a machine tool with efficiency, effectiveness and reliability.

An object of our invention is to provide apparatus for the automatic forward feed programmed control of a machine tool with efficiency, effectiveness and reliability.

An object of our invention is to provide a method and apparatus for automatic forward feed programmed control of a machine tool which provides optimum regulation of the cutting depth.

In accordance with the present invention, a method of optimum adjustment of a digitally controlled machine tool in the machining process of a workpiece (W), wherein a control system of a programmed contour transmits appropriate control commands to the machine tool and wherein the relative speed of the machine tool to the workpiece is regulated in accordance with the forming power applied to the workpiece in a manner whereby the feed speed is decreased when the forming power is increased and the feed speed is increased when the forming power is decreased, comprises the steps of changing the programmed contour in the direction of decreasing processing depth ($+y$) when the forming power ($M_d$) exceeds a predetermined level ($M_{max}$), continuing the process in the direction of increasing processing depth ($-y$) to a maximum of the programmed contour when the forming power is less than a predetermined lower level ($M_{max} - \Delta$), digitally storing deviations from the programmed contour; and additionally utilizing the deviations for controlling the movement ($x,y$) of the machine tool to decrease said deviations in a manner whereby the contour is repeatedly removed until the actual contour of the workpiece coincides with the programmed contour.

When a threshold level ($M_{max} + \Delta$) above the upper threshold level ($M_{max}$) is exceeded, the feed-in ($x$) is interrupted for a period of time sufficient to enable the threshold level ($M_{max} + \Delta$) above the upper threshold level to be fallen short of. In accordance with the stored values, the deviation from the programmed contour during the course of operation is determined or is cancelled out and the operation is repeated until the actual contour of the workpiece coincides with the programmed contour.

The workpiece may be flat milled. The main feed directions are then predetermined in accordance with the actually travelled path of the machine tool and feed-in is effected perpendicularly to the feed direction and to the extent that a specific forming power is provided.

The threshold level ($M_{max} + \Delta$) above the upper threshold level ($M_{max}$) is replaced by a predetermined penetration depth of the machine tool into the workpiece.

In accordance with out invention, apparatus for optimum adjustment of a digitally controlled machine tool in the machining process of a workpiece (W), wherein a control system of a programmed contour includes feeding means for transmitting appropriate control commands to the machine tool and for regulating the relative speed of the machine tool to the workpiece in accordance with the forming power applied to the workpiece in a manner whereby the feed speed is decreased when the forming power is increased and the feed speed is increased when the forming power is decreased comprises work feeding means for changing the programmed contour in the direction of decreasing processing depth ($+y$) when the forming power ($M_d$) exceeds a predetermined level ($M_{max}$) and for continuing the process in the direction of increasing processing depth ($-y$) to a maximum of the programmed contour when the forming power is less than a predetermined lower level ($M_{max} - \Delta$). Reversible counter means digitally stores deviations from the programmed contour. Additional work feeding means additionally utilizes the deviations for controlling the movement ($x, y$) of the machine tool to decrease the deviations in a manner whereby the contour is repeatedly removed until the actual contour of the workpiece coincides with the programmed contour.

A reversible counter (7, 9) stores the deviation from the programmed contour and a variation in feed-in at a digital reference value output. A pulse generator (8, 10) is provided. Measuring means is provided for measuring the cutting power. Critical value indicating means (11, 12, 13, 14) is connected to the reversible counter, the pulse generator and the measuring means and has variable response levels. The critical value indicating means produces output signals for blocking the forward feed drive of the machine tool and controlling the reversible counter and pulse generator.

When the method and apparatus of our invention are utilized, it is no longer necessary to program the cutting distribution prior to the actual machine operation. It is also, possible, at any time, to provide the optimum cutting depths. Thus, maximum utilization of the machine tool is provided.

In the method of our invention, even when the threshold level above the upper magnitude of the forming power is exceeded, the forward feed is interrupted for such time until such threshold level is fallen short of. Furthermore, the movement commands supplied by the control system during the interruption of movement of the machine, and the change in feed-in, are stored. In accordance with the stored magnitudes, deviation from the programmed contour is considered or is cancelled out during processing. The machine operation is repeated as often as necessary until the actual contour of the workpiece coincides with the programmed contour.

In order that the present invention may be readily carried into effect, it will now be described with reference to the accompanying drawings, wherein.

It is necessary to distinguish between rapid feed speeds and work feed speeds. Feeding may be undertaken at rapid feed velocities or speeds as long as the machine tool is not engaged. It is characteristic that the torque at the spindle or cutting tool, or the cutting force, remain below a minimum value or level. When the minimum value is exceeded, it indicates that the tool is engaged and that cutting must be undertaken at the correct work feed. The method of switching from a rapid feed or speed to a work feed or speed is disclosed in the aforementioned copending Patent application Ser. No. 777,832.

The objective of optimum cutting depth regulation is to control the cutting process so that it proceeds, for example, with a constant torque of the machine tool or with a constant power input to the driving motors of said machine tool. This permits the machine tool to be utilized almost to a maximum.

Figure 1:
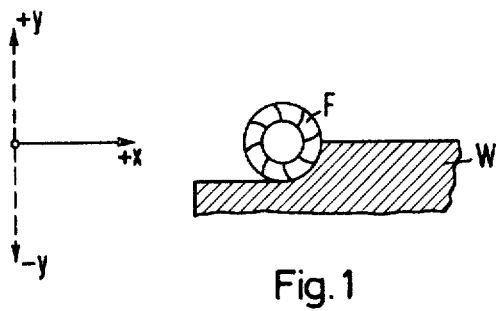
FIG. 1 is a schematic diagram illustrating the relationship between changes or variations in cutting depth and feed.

Generally, the directions of the change in cutting depth and the change in the feed are perpendicular to each other, as shown in FIG. 1. Any suitable processing of a workpiece W must be directed toward reducing too great a torque, by reducing the cutting depth. Thus, a milling tool F must be moved in a direction away from the workpiece W in +y direction. In the reverse situation, when too small a torque is provided during the feed in +x direction, the cutting depth must be increased. Thus, the milling tool F must then move at maximum speed in —y direction until it reaches the preprogrammed contour.

Figure 2:
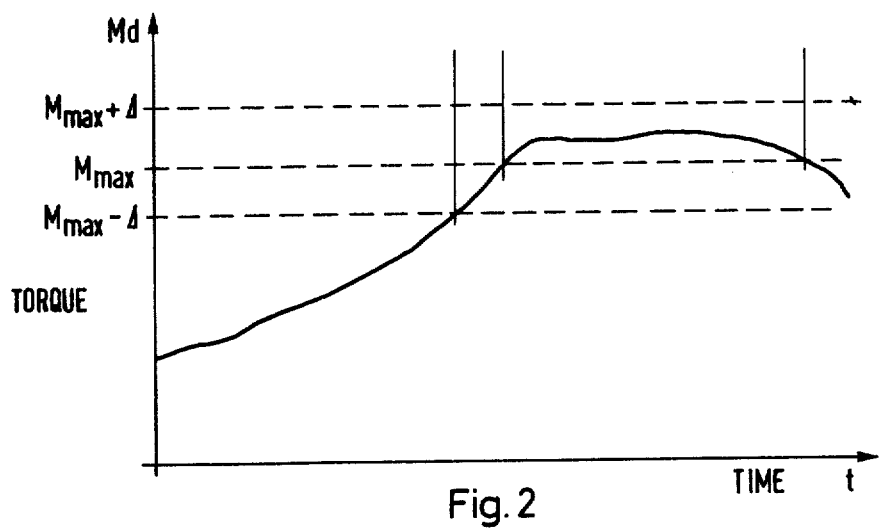
FIG. 2 is a graphical presentation illustrating a conceivable torque curve.

FIG. 2 illustrates the basic mode of operation of the cutting depth regulation. In FIG. 2, the abscissa represents the time t and the ordinate represents the torque Md. Two thresholds are required for the torque. These thresholds are $M_{max}$, at which a reduction in cutting depth is provided, and $M_{max} - \Delta$, at which an increase in the cutting depth is provided. At another threshold $M_{max} + \Delta$, another operation is provided, as hereinbefore described.

Generally, the change in cutting depth is effected at the same speed as the main feed. Effective cutting depth alteration or variation is based upon the prerequisite that a reduction in the cutting depth will actually lead to a reduction in the torque, and vice versa. The contour, shape, form or configuration of the resultant workpiece is the decisive factor. It is intended, in the method and apparatus of our invention, to simplify the programming to such an extent that it will suffice to program only the contour. The feed and the cutting depth are then determined during the actual processing or operation.

Figure 3A:
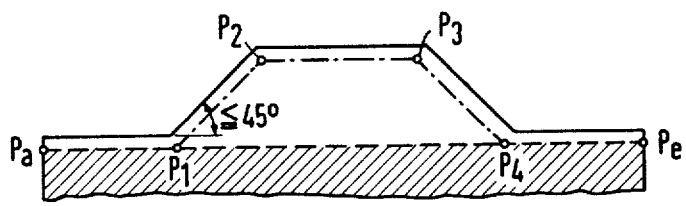
FIG. 3a, 3b, 4a, 4b, 5, 6, 7a and 7b illustrate various methods for providing variable workpiece contours.
Figure 3B:
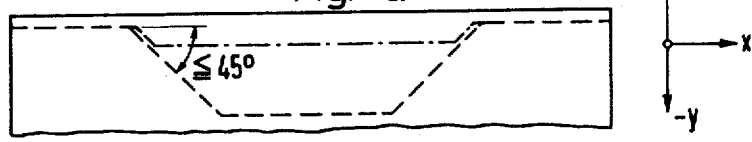

FIGS. 3a and 3b illustrate a method of automatic feed control which permits a change in the forward feed direction up to approximately 45°. In FIGS. 3a and 3b, the solid lines indicate the actual contour of the workpiece and the broken lines indicate the contour which is programmed, that is, the desired contour. Thus, for example, the dot dash line illustrates the contour of the workpiece after the initial processing operation.

As illustrated in FIGS. 3a and 3b, elevations may be machined, ground, cut or worked off and depressions may be machined, ground, cut or worked out. When the torque applied to the cutting tool (not shown in FIGS. 3a or 3b) becomes too large, the cutting depth is reduced, and vice versa. The preprogrammed contour is deviated from in the direction of the cutting depth coordinate y, as shown in FIG. 3b. This deviation must be stored or recorded in a reversible counter, as shown in, and described with reference to, FIG. 8.

The workpiece is processed as many times as necessary to provide the desired resultant contour indicated in broken lines. The desired contour is provided when there is no longer any torque, during the entire operation or process. The complete contour is then rapidly processed.

In the aforedescribed method, the maximum feasible slope of 45° results from the fact that the speed of feeding or movement of the cutting tool and the change in the cutting depth are assumed to be equal. When changes up to 90° become necessary in the required feed direction, the operation must be altered, since it may happen, in an extreme case, that the main feed or movement becomes blocked and a feed or movement may only occur in the direction of a change in the cutting depth.

Figure 4A:
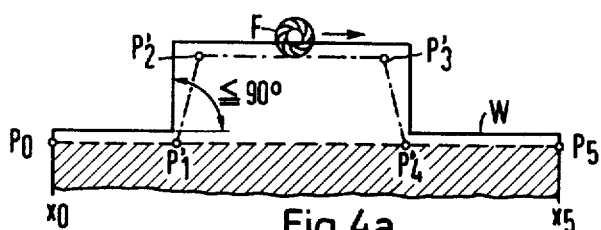
Figure 4B:
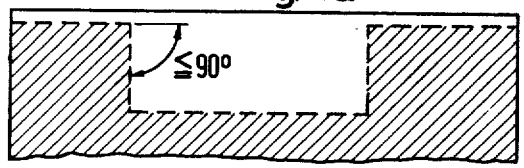

FIG. 4a illustrates a method for removing a projection from the top of a workpiece W. When a milling tool F is moved toward the workpiece W, the torque applied to said tool will exceed the threshold level $M_{max}$. As soon as the threshold level $M_{max}$ or the torque is exceeded, the cutting depth or depth of the cut is reduced in the direction +y, as shown in FIG. 4b. This, however, does not immediately result in the reduction of the torque. In addition to changing the cutting depth in the +y direction, it is necessary to block the main feed or movement in +x direction (FIG. 4b).

As soon as the threshold level $M_{max} + \Delta$ of the torque, which threshold level is higher than the upper or maximum threshold level $M_{max}$ (as shown in FIG. 2), is exceeded, the feed in the $x$ direction is blocked. The feed is then provided only in the $+y$ direction and the torque is thus no longer increased. Since the digital or numerical control system will continue to provide pulses in the $+x$ direction, however, such pulses must be supplied to a second reversible counter which records or stores the deviation from the main feeding, feed or movement. The appropriate counter circuit is shown in, and described with reference to, FIG. 9.

A similar operation is provided for producing a pocket, channel, groove, bore, or the like, as shown in FIG. 4b. When no special measure is provided such as, for example, the blocking of the feed $-y$ when a specific depth of cutting is reached, the milling tool or cutter (not shown in FIG. 4b) will move into the workpiece too deeply when it moves along a perpendicular line. During the subsequent feeding process, which continues in $x$ direction, a similar process should be followed in principal, to that utilized during the removal of the projection in FIG. 4a.

It may therefore be simpler, during the milling or machining of a depression, bore, or the like, to limit the maximum cutting depth from the beginning. A potentiometer may thus be utilized to set or adjust the maximum cutting depth, limited to approximately one half the diameter of the milling tool. The potentiometer may be adjusted to a desired setting by an operator or attendant, prior to the commencement of the process or operation.

Figure 5:
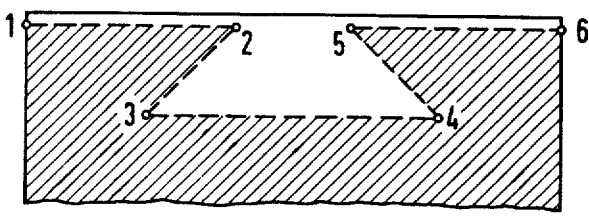

A different method must be utilized to form a dovetail or undercut contour, as shown in FIG. 5. The change in the cutting depth should no longer be provided perpendicularly to the main forward feed direction, since this would result in exceeding the programmed resultant contour. It is therefore necessary to store or record the angles formed by the prior process path with the adjacent path, in the machine.

In FIG. 5, the reduction in the cutting depth must be provided in the contour path or path 2–3 with the rise of the path 3–4. It is more difficult in the path 3–4, since the change in the cutting depth must be provided along the first half of said path, in the direction of the proceeding path 2–3, and in the second half of the path 3–4, in the direction of the next-following path 4–5. The inclinations or slopes of both adjacent contour paths must be stored or recorded in order to provide the proper type of process or operation. Furthermore, the most recently processed path must be divided in half and the directions of the changes in cutting depth must be accordingly taken into consideration.

The method and apparatus of our invention may be utilized to mill flat a workpiece of any shape. It is unnecessary to predetermine or program the contour paths prior to the machine operation. The milling tool is guided automatically in accordance with the rated torque.

Figure 6:
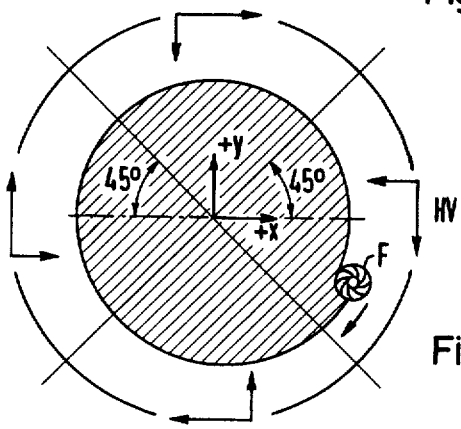

In the method illustrated in FIG. 6, the main forward feed directions HV are determined in accordance with the actually travelled contour path direction. The cutting depth or depth of the cut is perpendicular to the main feeding direction to an extent such that a specific desired torque is provided. The conclusion of the machining process is indicated by the fact that despite an increase in cutting depth, no noticeable torque occurs. The machine tool may then be disengaged.

Figure 7A:
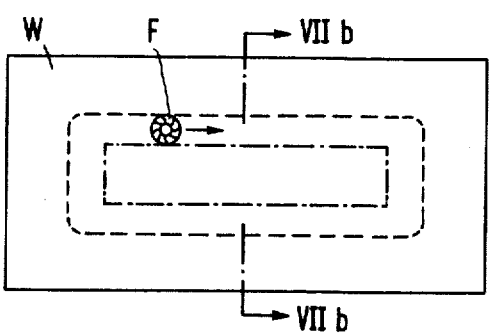
Figure 7B:
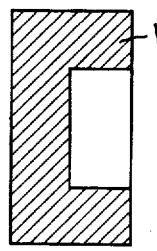

The method and apparatus of our invention may be utilized to mill components, depressions, cavities, channels, bores, or the like, of specific configuration, which are to be machined into a workpiece W. At the commencement of the operation or process, the area of the desired contour is pre-bored to a required depth. During the next stage of the process, the milling tool F, as shown in FIG. 7a, may be utilized in the area of the bore. The milling tool F is moved along the entire contour at a reduced forward feed. The movement must be at a reduced speed, since the entire diameter of the milling tool F is utilized for the cutting depth and the minimum permissible torque must not be exceeded.

The last stage of the operation comprises milling the remaining inside area of the cavity to a planar configuration. This stage thus involves the method for planar milling. The forward speed of movement of the cutting tool is increased to the extent that, at a miximum torque, the utilized cutting depth is less than the diameter of the milling tool. The termination of the machining process is indicated when the rated torque reaches zero.

Figure 8:
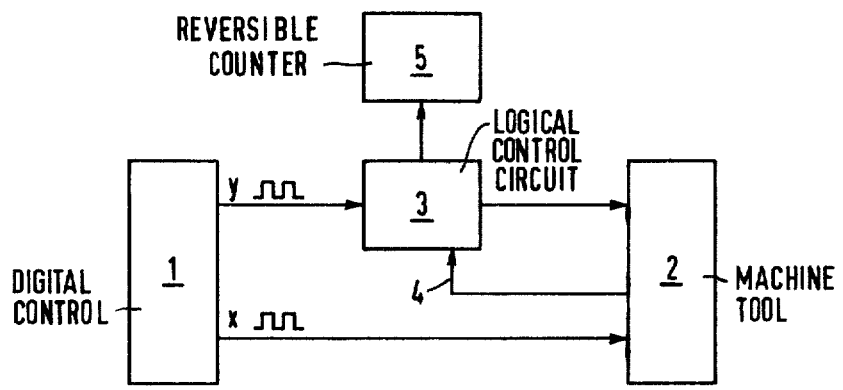
FIG. 8 is a schematic block diagram of a circuit arrangement for performing the method illustrated in FIGS. 3a and 3b.

FIG. 8 is a schematic diagram of the apparatus or circuit arrangement of the present invention for performing the method of the present invention, as illustrated in FIGS. 3a and 3b. A digital control 1 produces control pulses $x$ and $y$ and supplies such control pulses to the $x$ and $y$ drives of machine tool 2. The $x$ control pulses are supplied to the $x$ drive or stepping motor, for example, and the $y$ control pulses are supplied to the $y$ drive or stepping motor, for example. A logical control circuit 3 is connected into the $y$ control circuit which transfers the $y$ control pulses from the digital control 1 to the machine tool 2. An input of the logical control circuit 3 is connected to the digital control 1, an output of said logical control is connected to machine tool drives and an output of said logical control circuit is connected to the input of a reversible counter 5. The logical control circuit 3 has a second input connected to the machine tool 2 via a lead 4.

The logical control circuit 3 provides an increase or decrease in the cutting depth of the machine tool 2 in accordance with the torque applied thereto, as hereinbefore described. The operation of the circuit arrangement or apparatus of FIG. 8 is described with reference to FIG. 3a. The contour $P_a$, $P_1$, $P_4$ and $P_e$ is programmed as a unit. This may be in a perforated strip, for example. Only $x$ control pulses are provided. No $y$ pulses are provided. The torque M applied to the cutting tool while it moves along the path $P_a$ to $P_1$ is less than the upper threshold level $M_{max}$ of the torque. There is thus no reason for reducing the cutting depth, that is, to move the cutting tool in the direction $+y$ (FIG. 3b).

If the reverse were true, and the torque M were less than the lower threshold level $M_{max} - \Delta$ of the torque, no increase would be provided in the cutting depth, since the contour produced by the cutting tool would then coincide with the programmed contour. The contour is monitored by the zero position of the reversible counter 5.

When the tool reaches the point $P_1$, the torque M applied thereto exceeds the upper threshold level $M_{max}$. This signals the logical control circuit 3 to supply $+y$ control pulses to the machine tool to reduce the cutting depth. The +y control pulses, which comprise a y deviation from the programmed contour, are simultaneously supplied to the reversible counter 5. If the forward feed speeds in the x and y directions are equal to each other, the cutting tool moves at an angle of 45° to the point $P_2$, as shown by the broken dot and dash line.

At the point $P_2$ the cutting tool begins to move freely and the upper threshold level $M_{max}$ is thereby fallen short of. As a result, the reduction in the cutting depth +y is blocked or halted and the tool moves along the contour path $P_2$ to $P_3$. The tool again moves freely and the torque decreases to a magnitude which is less than the lower threshold level $M_{max} - \Delta$. This indicates that the cutting depth will increase. The increase in the cutting depth is permissible, however, since the programmed y contour deviates from the actual contour, as indicated by the count condition of the reversible counter 5.

The logical control circuit 3 (FIG. 8) then supplies −y pulses to the machine tool 2 and to the reversible counter 5. The tool 2 (FIG. 8) then moves from the point $P_3$ to the point $P_4$ along the contour path $P_3$ to $P_4$. At the point $P_4$, the count condition of the reversible counter 5 is zero. This indicates that the cutting depth y must not be further increased. The logical control circuit 3 thus does not provide any more pulses. The machine tool then moves along the contour path $P_4$ to $P_e$ from the point $P_4$ to the point $P_e$. The cycle is then repeated, from the point $P_a$ to the point $P_e$, as described, until the machine tool moves over the entire contour at rapid speed. When the machine tool moves over the entire contour path at rapid speed, the actual contour coincides with the programmed contour, and such contour is indicated by the linear broken line $P_a$ $P_1$ $P_4$ $P_e$. The method described for providing the broken contour of FIG. 3a may be utilized to provide the depressions, channel, groove, and the like, of FIG. 3b. In FIG. 3b, the dot and dash line indicates the contour path of the machine tool in one cycle of operation. The desired contour is indicated by the broken line.

Figure 9:
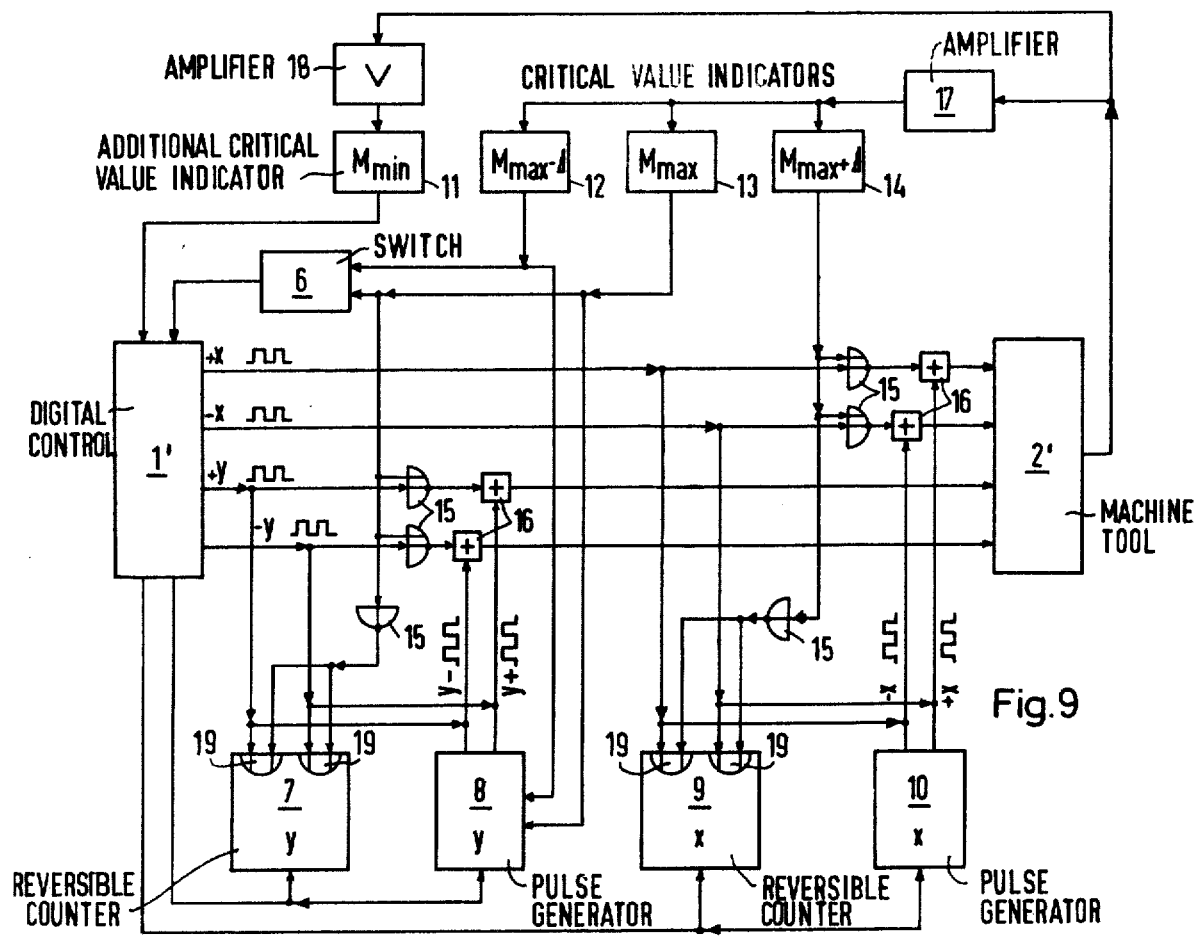
FIG. 9 is a schematic block diagram of a circuit arrangement for performing the method illustrated in FIGS. 4a and 4b.

FIG. 9 illustrates apparatus or a circuit arrangement of the present invention for performing the method of the present invention illustrated in FIG. 4a. In FIG. 9, as in FIG. 8, a digital control 1' produces +x, −x, +y and −y control pulses and supplies said pulses to a machine tool 2'. A plurality of critical value indicators is provided. The critical value indicator 12 has a variable response sensivity to the lower threshold level $M_{max} - \Delta$. The critical indicator 13 has a variable response sensivity to the upper threshold level $M_{max}$. The critical indicator 14 has a variable response sensivity to a threshold level $M_{max} + \Delta$ above the upper threshold level. The machine tool 2' is connected to the input of each of the critical value indicators 12, 13 and 14 via an amplifier and smoothing circuit or filter 17. The part of the machine tool 2' which is connected to the amplifier 17 is the measurand transmitter thereof, which may comprise, for example, the torque transmitter.

The critical value indicators 12, 13 and 14 of FIG. 9 may comprise simple electronic trigger circuits which change their output signal upon exceeding a specific critical value. A corresponding electronic trigger is described, for example, in a periodical entitled, "Electrical Manufacturing," September 1959, pages 133 to 134, FIG. 13. A voltage proportional to the measured torque M is applied to one input of the circuit. A voltage which corresponds to the programmed torque value $M_{max}$ is applied to the other input of the circuit. The output signal of the circuit depends upon whether the measured torque is greater or smaller than the programmed torque. Similar critical value indicators are disclosed in FIG. 2 of U.S. Pat. No. 3,573,588.

Relays may be utilized instead of an electrical trigger circuit. The relays respond when a certain voltage is reached and drop when such voltage is not reached.

The amplifier 17 of FIG. 9 may comprise a simple transistor amplifier with a smoothing capacitor C connected to its output.

The outputs of the critical value indicators 12 and 13 are connected to an input of the digital control 1' via a switch 6. The measurand transmitter of the machine tool 2' is connected to another input of the digital control 1' via an amplifier 18 and an additional critical value indicator 11, connected in series circuit arrangement therewith, which is variable response sensivity to a minimum threshold level $M_{min}$ of the torque. The output signals of the critical value indicators 12, 13 and 14 control the type or mode of operation or process, as well as the blocking or release of a power reversible counters 7 and 9 and a pair of pulse generators 8 and 10.

The reversible counter 7 is for the y direction, the reversible counter 9 is for the x direction. The pulse generator 8 is for the y direction and the pulse generator 10 is for the x direction. The control of the pulse generators 8 and 10 by the digital control 1' is effected via NOR stages or gates 151, 152, 153, 154, 155 and 156 and adders or adding components 161, 162, 163 and 164, which lock the additional control pulses into the corresponding pulse generators 8 and 10. The digital control 1' controls the reversible counters 7 and 9 via NOR gates 191, 192, 193 and 194. The additional critical value indicator 11 controls the changeover from rapid to working speed of the tool.

The numerical machine tool control system of the circuit arrangement of FIG. 9 is described as follows. Numerical machine tool controls are known, as disclosed, for example, in U.S. Pat. Nos. 3,418,549 or 3,190,139, where a numerical or digital control 1', for example an interpolator, delivers the x and y control pulses for a machine tool 2'. The control then operates according to the commands fed into it from the outside, for example from a perforated tape.

The feed velocity system, which depends on the measured torque is described as follows. The machine tool 2' is provided in a known manner with a measuring device which delivers an electrical magnitude which is proportional to the torque M of the tool spindle and which is used to control the feed velocity. (See, for example, U.S. Pat. Nos. 3,220,315 or 3,418,549).

According to the example of FIG. 9, the measuring device is connected to four threshold value indicators which become active, respectively, at a specific value of the measured torque. Depending upon the energization or the becoming effective of the threshold indicators 11 to 14, the feed velocity is first controlled in x and y directions, for example, by changing the pulse frequency of the interpolator, that is, the frequency of the control pulses.

In the aforedescribed example, the four thresholds are $M_{min}$, $M_{max} - \Delta$, $M_{max}$, $M_{max} + \Delta$. In the present disclosure, the thresholds are defined as follows.

a. $M < M_{min}$ means that the tool is free, the machine can operate at rapid speed, and none of the threshold indicators 11 to 14 has responded.

b. $M > M_{min}$ means that the tool has reached the workpiece, the threshold indicator 11 responds and transmits to the control a command for switching from rapid movement to "high" operating speed.

c. $M > M_{max} - \Delta$ means that the threshold indicator 12 responds and issues a command, via the changeover switch 6, for reducing the velocity to operating speed.

d. $M > M_{max}$ means that the threshold indicator 13 responds and switches the machine to slow operating speed.

e. $M > M_{max} + \Delta$ means that the threshold indicator 14 is effective and stops the feeding completely by blocking the $x$ pulses.

The system of the circuit arrangement of FIG. 9 for reducing the depth of cut in dependence upon the torque M and thus abandoning the final contour, predetermined by the perforated tape, is described as follows. With regard to the reduction of the depth of cut, when the measured or rated torque M exceeds the value $M_{max}$, the threshold indicator 13 becomes effective and effects, in addition to the reduction of the feed velocity, a reduction in the depth of cut also, in the direction $+y$. This constitutes a deviation from the programmed contour.

To accomplish this, the signal of the threshold indicator 13 releases the pulse generator 8, that is, so that it can deliver pulses at its plus output. The pulse generator 8 then issues pulses to the $+y$ control mechanism, via the digital adding component 161, so that the tool is moved in $+y$ direction. Simultaneously, these $+y$ pulses, which constitute a deviation from the programmed contour, are fed in + direction into the reversible counter 7 via the NOR gate 192. The NOR gate 192 is controlled via the NOR gate 156 and the threshold indicator 13. The remaining feed in $y$ direction is blocked by the NOR gates 151 and 152.

When the torque M falls below the value $M_{max}$, the threshold indicator 13 reverses or trips and the pulse transmission is blocked in the $+y$ channel, since the correct depth of cut has thus been obtained.

With regard to cancelling or reversing the $+y$ deviation, if the measured torque M falls below $M_{max} - \Delta$ the threshold indicator 12 becomes effective. In addition to performing the switchover to work feed, its output signal also effects the release of the $-y$ pulses, in the pulse generator 8, which means the cancellation of the deviation. The $-y$ pulses arrive, via the adding component 162, at the machine tool 2' and at the same time enter into the reversible counter 7, via the NOR gate 191, and count said counter back in $-y$ direction, if necessary for as long as required until the position of said counter is again at zero, that is, until the deviation is cancelled.

When the measured torque M exceeds the value $M_{max} + \Delta$, the threshold indicator 14 becomes effective and blocks the $x$ feed by issuing a blocking signal to the NOR gates 153 and 154. To prevent the control pulses from being lost in the $+x$ circuit, they are fed into the reversible counter 9 via operation of the NOR gate 193.

This deviation from the pre-programmed contour in $+x$ direction is removed so that the digital control 1' issues a start command to the pulse generator 10 at the end of the processing section. The pulse transmitter 10 then transmits $+x$ pulses to the reversible counter 9, via the NOR gate 194, for such time as required for the counter 9 to again reach zero; the pulse generator 10 is then halted in operation. Since the $+x$ pulses arrive simultaneously at the machine tool 2' via the adding component 163, the $x$ deviation will also be cancelled when the reversible counter 9 is again at zero position.

In FIG. 4a, the desired contour path is indicated as $P_0$, $P'_1$, $P'_4$ and $P'_5$. The feed or movement of the machine tool is from $x_0$ to $x_5$. The digital control 1' (FIG. 9) thus supplies to the machine tool 2' a number of $x$ pulses corresponding to the distance $x_0$ to $x_5$.

If the milling or cutting tool F of FIG. 4a is not at the point $P_0$ at the commencement of the milling process or operation, said milling tool initially moves at rapid speed toward the workpiece W. The torque M applied to the cutting tool F remains less than the minimum torque or threshold level $M_{min}$. At the point $P_0$, the tool F engages the workpiece W. The torque applied by the torque transmitter to the machine tool 2' then exceeds the minimum threshold level $M_{min}$. This causes the additional critical value indicator 11 (FIG. 9) to initiate the work feed. When the torque increases so that it is greater than the lower threshold level $M_{max} - \Delta$ and less than the upper threshold level $M_{max}$, the working process proceeds rapidly. If the torque were to increase to a magnitude greater than the upper threshold level $M_{max}$, the work process would proceed slowly and the cutting depth would be reduced.

If the cutting tool F is positioned along the contour path $P_0$ to $P'_1$ and the torque applied to said tool is between the lower threshold level and the upper threshold level, said contour path is milled at rapid speed. When the milling tool F abuts the projection at the point $P'_1$, the upper threshold level $M_{max}$ of the torque is exceeded. The work process then continues slowly, rather than rapidly, and a command is simultaneously provided to reduce the cutting depth in the direction $+y$ (FIG. 4b). The pulse generator 8 of FIG. 9 is controlled by the critical value indicator 13 for this purpose. The pulse generator 8 supplies $+y$ control pulses to the machine tool 2' via the corresponding adder 16.

The $+y$ control pulses supplied by the pulse generator 8 to the machine tool 2' are also supplied to the reversible counter 7. Since this corresponds to a substantially vertical contour path, the threshold level $M_{max} + \Delta$ above the upper threshold level is exceeded a short time thereafter. This causes the critical value indicator 14 to respond and block the $x$ forward feed. The critical value indicator 14 controls the pulse generator 10 to supply $+x$ pulses to the reversible counter 9 and to the machine tool 2' via the corresponding adder 16. The milling tool F then moves from the point $P'_1$ to the point $P'_2$ (FIG. 4a).

The torque applied to the tool F becomes less than the threshold level $M_{max} + \Delta$ when said tool is in the vicinity of the point $P'_2$. As a result, the $x$ control pulses are supplied to the machine tool F. The torque decreases to less than the upper threshold level $M_{max}$ due to the reduction of the cutting depth. The reduction of the cutting depth is halted at the point $P'_2$ in the direction $+y$. The contour path $P'_1$ to $P'_2$ is then recorded or stored in the reversible counter 7. The contour path which the tool 2' or F would have moved in the $x$ direction, if the $x$ forward feed were not blocked, is stored or recorded in the counter 9.

The cutting tool F is moved from the point $P'_2$ to the point $P'_3$ along the contour path $P'_2$ to $P'_3$ in FIG. 4a. At the point $P'_3$, the cutting tool moves freely, so that the torque applied thereto becomes less than the minimum threshold level $M_{max} - \Delta$. A command signal is then supplied to the pulse generator 8 and said pulse generator, in response to said command signal, supplies control pulses for increasing the cutting depth. The $y$ control pulses are simultaneously supplied to the reversible counter 7 and said counter then counts backward. When the machine tool reaches the point $P'_4$ at the end of the contour path $P'_3$ to $P'_4$, the count condition of the reversible counter 7 is zero. The pulse generator 8 is then halted in operation and the cutting tool 2' (FIG. 9) is moved in $x$ direction, along the contour path $P'_4$ to $P'_5$, from the point $P'_4$ to the point $P'_5$.

Only the $x$ direction control pulses supplied to the reversible counter 9 during the blocking condition are unaccounted for. To account for these pulses, the repetition of the operation or process cycle should be blocked or delayed until the count condition of the reversible counter 9 reaches zero. At the end of each cycle of operation a command is transferred to the pulse generator 10 (FIG. 9), in the aforedescribed manner, so that said pulse generator supplies control pulses simultaneously to the counter 9 of the machine tool 2', until said counter again reaches its zero count condition. The cycle, as described, is then repeated until the entire contour path $P_0$, $P'_1$ $P'_4$ $P'_5$ is traversed by the tool at rapid speed. At such time, the desired contour path, indicated by the broken lines, is actually attained.

The aforedescribed operation may be utilized to provide the contour shown in the FIG. 4b.

Our invention is not limited to use in milling machines, but may be utilized to similar advantage in planing and grinding machines, as well as other types of machines. Furthermore, additional data may be incorporated in the control system. Such data may include the temperature of the machine tool, the stability thereof, and so on. It is also feasible to read the complete program into the control system at least once, to maintain the sub-program in which the programmed contour is provided, and to release the sub-program during the subsequent process or operation.

Each of the component blocks of each of FIGS. 8 and 9 represents a known circuit arrangement and any suitable circuit which functions in the manner indicated may be utilized as such block.

While the invention has been described by means of specific examples and in specific embodiments, we do not wish to be limited thereto, for obvious modifications will occcur to those skilled in the art without departing from the spirit and scope of the invention.

We claim:

1. Apparatus for optimum adjustment of a digitally controlled machine tool in the machining process of a workpiece (W) wherein a control system of a programmed contour includes feeding means for transmitting appropriate control commands to the machine tool and for regulating the relative speed of the machine tool to the workpiece in accordance with the forming power applied to the workpiece in a manner whereby the feed speed is decreased when the forming power is increased and the feed speed is increased when the forming power is decreased, said apparatus comprising work feeding means for changing the programmed contour in the direction of decreasing processing depth ($+y$) when the forming power ($M_d$) exceeds a predetermined level ($M_{max}$) and for continuing the process in the direction of increasing processing depth ($-y$) to a maximum of the programmed contour when the forming power is less than a predetermined lower level ($M_{max} - \Delta$); reversible counter means for digitally storing deviations from the programmed contour; and additional work feeding means for additionally utilizing the deviations for controlling the movement ($x$, $y$) of the machine tool to decrease said deviations in a manner whereby the contour is repeatedly removed until the actual contour of the workpiece coincides with the programmed contour.

2. Apparatus as claimed in claim 1, further comprising reversible counter means 7, 9 for storing the deviation from the programmed contour and a variation in feed-in at a digit reference value output, pulse generating means (8, 10), measuring means for measuring the cutting power, critical value indicating means (11, 12, 13, 14) connected to said reversible counter means, said pulse generating means and said measuring means, said critical value indicating means having variable response levels and producing output signals for blocking the forward feed drive of the machine tool and controlling the reversible counter means and pulse generating means.

* * * * *